United States Patent [19]

Johnson

[11] Patent Number: 5,154,452
[45] Date of Patent: Oct. 13, 1992

[54] TUBULAR CONNECTION WITH S-THREAD FORM FOR CLAMPING CENTER SEAL

[75] Inventor: Fred W. Johnson, 101-C E. 30th St., Austin, Tex. 78705

[73] Assignee: Frederick William Johnson, Austin, Tex.

[21] Appl. No.: 761,727

[22] Filed: Sep. 18, 1991

[51] Int. Cl.$^5$ ............................................. F16L 15/00
[52] U.S. Cl. .................................. 285/333; 285/175; 285/332.3; 285/355; 285/391
[58] Field of Search .................. 285/334, 332.3, 332.4, 285/355, 390, 391, 333, 175; 403/343; 411/411, 416

[56] References Cited

U.S. PATENT DOCUMENTS

| | | | |
|---|---|---|---|
| 2,543,100 | 12/1948 | Engh | 411/411 X |
| 4,373,754 | 2/1983 | Bollfrass et al. | 285/334 |
| 4,377,302 | 3/1983 | Kohyama et al. | 285/334 |
| 4,384,737 | 5/1983 | Reysser | 285/334 |
| 4,619,472 | 10/1986 | Kozono et al. | 285/334 |
| 4,629,221 | 12/1986 | Lymsden et al. | 285/334 X |
| 4,629,224 | 12/1986 | Landriault | 285/334 |
| 4,662,659 | 5/1987 | Blose et al. | 285/334 |

Primary Examiner—Randolph A. Reese
Assistant Examiner—Timothy Aberle
Attorney, Agent, or Firm—Russell Culbertson

[57] ABSTRACT

A tubular connection employing two separate non-concurrent threaded sections, each of which nearly decays, that is, runs out on a tubular surface, one on the outside diameter of the male tubular member, and one on the inside diameter of the female tubular member, thus providing a joint with nearly the strength of the tubular body in tension without the use of a coupling. The female tubular member is expanded through a cold swaging operation before being finished with the two threaded sections. Additionally, the connection features a torque stop and cylindrical seal in the middle of the two thread steps, where stresses may be kept low. The thread elements are reverse angle locking with S-shaped load flanks which reduce stress concentrations and provide a clamping action on the centralized seal. Because of this unique seal, the connection can take cyclic application of external and internal pressure without leaking, a feat non-coupled and non-upset connections of prior art have not achieved. This invention is a total optimization of tension efficiency, pressure integrity, and low stress compared to all other connections of its genre.

13 Claims, 5 Drawing Sheets

TUBULAR CONNECTION WITH S-THREAD FORM FOR CLAMPING CENTER SEAL

FIELD OF THE INVENTION

This invention relates to tubular connections in oil and gas recovery. This invention is used to join pipe ends for high pressure and high axial loading applications. The class of products of which this invention belongs is commonly referred to by the petroleum industry as premium connections. This disclosure is an optimization of the prior art introduced in U.S. Pat. No. 4,707,001 by this inventor and is intended to introduce several new means by which the previous invention and the prior art is exceeded in performance, reliability, and ease of use.

BACKGROUND OF THE INVENTION

My previous invention was limited to strength in tension or comprehension, achieving tension efficiencies compared with the tubular body itself of approximately 75%, being greater as the wall thickness of the tubular is increased. For example, a 7⅝" outside diameter and 0.500 wall thickness liner connection of my previous invention, can only attain approximately 70% tension efficiency rating. As will be explained in this disclosure, my present invention obtains 90-95% tensile efficiency on the same tubular size and weight. The user of this invention saves money because a lighter grade tubular may be used to produce from a well and a longer tubular string may be used safely.

My previous connection, because of the particular design of the pressure seals, could not withstand a reverse pressure loading, that is, an internal burst pressure for that tubular size as rated by the American Petroleum Institute (API), followed by an external collapse pressure per API, and then finally subjected to another full internal burst pressure without failure of those seals. This invention is an improvement to my previous invention in that it will withstand API collapse pressure and show no leakage failure on subsequent internal pressure loading.

As a further improvement to my previous invention, this invention is much strengthened in resistance to torque. A source of damage of the previous connection is excessive torque in assembly. This connection features a torque stop located in the center of the joint which permits application of higher torque to the connection without damage. Locating the torque stop where the thickness of the relative members are nearly equal contributes to the higher torque capacity.

My previous connection offered protection of the primary seal surfaces but that protection is inadequate with moderately severe mishandling. My new invention provides maximum protection of the primary seal surfaces and the torque shoulder areas by locating said surfaces in the middle of the connection where the protection is greatest instead of on the ends as in my previous invention.

My previous connection offered thermoplastic seals with less tendencies for separating the male and female members upon assembly than other connections not using locking reverse load angle thread designs. Though the clamping action of the reverse angle thread profile in my previous design reduces the deflection of the members apart from the thermoplastic seal extrusion, some unwanted separation does occur. It occurs because the interferences on both ring and thread forms act concurrently, that is, in a dependent fashion. This separation reduces the effectiveness of the primary metal to metal seal in the immediate vicinity of said thermoplastic seals. There is also an increased amount of radial hoop stress generated by the radial separation of the male and female members. This invention remedies these faults simply by not requiring a thermoplastic ring. Such a ring may be used, however, but special techniques must be followed not covered by this invention to prevent compromising the primary seal.

My previous invention did not optimize the locking thread form that it introduced or specify preferred embodiments of the particular thread. My previous invention uses a variety of locking thread forms in which various design parameters such as radial and thread clearances, root and crest radii, and tolerance setting all may be varied, often to the detriment of the design. Consequently, modifications within the scope of this previous invention could compromise the invention's performance. This invention presents a thread element design that produces very low stress on engagement over the previous invention. Greater tolerance areas between mating threads are permitted without increasing the torque required to screw the parts together than in my previous invention. My new invention is more durable and reliable, being able to provide more repeated make-ups (assemblies) and break-outs (disassembles) without appreciable wear or change from originally manufactured tolerances than my prior invention.

Finally, my previous invention does not optimize low stress. The end of the female member (known as the face of the box) is relatively thin in cross section by design as is the end of the male member (otherwise known as the pin nose). Being thin, these ends easily deflect on being loaded and thus produce high values of radial and hoop stress. My new invention disclosed herein reduces such stress since it does not permit the end sections to be moderately stressed in the radial direction. The seal is situated in the middle of the connection where both inner and outer (male and female) sections are thickest and designed to be equally stiff with respect to one another. As a result the deflections are minimal and the stresses correspondingly low. Seal pressures are maximized. Torque shoulders are located in the same balanced vicinity so that they will contribute minimally to the stress in the connection.

There are a number of different sealing arrangements in the present art of these connections and are not known to be combined in the manner claimed herein. The NJO connection, licensed to Baker International and to others, features threaded sections with threads which do not decay on both the male and female connection members. Pressure seals are located at the end of the threaded sections. Because of using thread extremities for seals, it cannot achieve the same level of tension loading as my invention. Another connection manufactured by Hydril Company called the MAC is similar to the NJO in having two threaded sections, but it does not feature the threaded sections with decaying threads characteristic of my invention. To my knowledge none of these designs or others feature a cylindrical seal with decaying threads at both thread extremities.

OBJECTS AND ADVANTAGES

It is an object of the present invention to provide a tubular connection which is able to provide nearly the full tension strength of the tubular member upon which it is applied without using a coupling or forged upset end.

A further object of the present invention is to provide full pressure integrity on full internal, full external pressure cycling as a result of a novel primary seal design, rather than relying on two separate sealing areas.

Another object is to feature a gall resistant, low stress thread element, which exhibits unique S-shaped loading flanks, and specifying the design detail of such thread so that should it be manufactured in this invention, it will conform to a basic specification preventing unwanted stress or performance degradation.

Yet another object is to provide a non-concurrent interference engagement between the threaded elements and the metal to metal primary seal so as to prevent interdependencies of their separate interferences; as a result pressure sealing integrity is not compromised.

These and other objects of my invention are accomplished through a novel combination of features which optimize the prior art of my own invention and others to produce a high pressure seal in a connection with very low stress profiles under any combination of pressure and tension/compression loading. The improvement in stress is accomplished by moving the primary seal and torque shoulder into the middle region of the connection where male and female connection members are equal in relative stiffness. Higher tension/compression loading is realized by allowing the thread elements to decay in the areas proximal to the full tubular product. This decay is set but not limited to approximately half of one thread height penetration of the last engaged threads. In this manner the tension strength of this optimized connection approximates the tension strength of those connections using a union, or coupling, to join separate lengths of tubulars.

DESCRIPTION OF THE INVENTION

An increased bearing pressure of a centrally located seal may be understood by maximization of the Lame expression for the bearing pressure between any two interfering cylinders which is expressed as:

$$P_b = \frac{EI(C^2 - X^2)(X^2 - A^2)}{X^3(C^2 - A^2)} \tag{1}$$

where
- $P_b$ = bearing pressure between the two cylinders (lbs./in$^2$)
- C = outside diameter of larger cylinder (in.)
- A = inside diameter of smaller cylinder (in.)
- X = interface diameter of two cylinders on assembly (in.)
- E = Young's modulus, that is, constant of stiffness of material used (lbs./in$^2$)
- I = diametrical interference (in.)

When the first derivative of $P_b$ with respect to X is taken and set equal to zero and then simplified we have $$X = \sqrt{\frac{A^2 + C^2}{2}} \tag{2}$$

Figure 1:
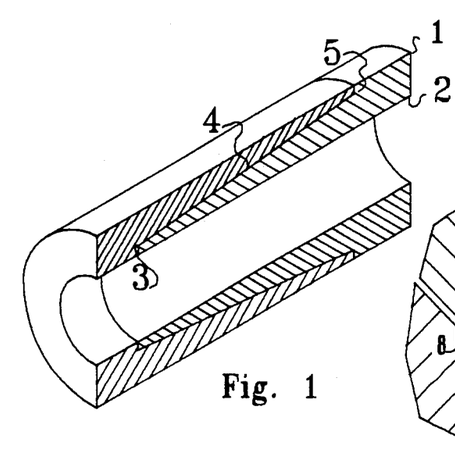
FIG. 1 is a perspective view a two tubular joined along a line of interference contact

This particular value of the diameter, x, will ensure the maximum value of the bearing pressure, $P^2$, and provide the greatest possible sealing pressure between the two connection members. At this diameter the connection members are equally as stiff with respect to each other. Refer to FIG. 1. For optimum sealing this diameter should be located in the vicinity of interface 4 rather than 2 or 3.

A cross section is shown of the respective walls of a tapered interface between two cylinders. The interface shown does not detail an actual thread element but indicates only the line along which the two cylinders are mated. The outside diameter 1 and inside diameter 2 of the assembly will be assigned values of 8.037 and 6.625 respectively. These values are the same as those under the primary seal discussed in the following section. The positions between the interface are referred to be the numerals 3, 4, and 5. These represent the values for X in eq. 1 and are 6.812, 7.359, and 7.837 respectively. The radial pressure between contacting services at the diameters indicated by numerals 3, 4, and 5 are $Pb_1$, $Pb_2$, and $Pb_3$. The bearing pressures in terms of E and I for each of the diameters found along the interface are calculated using equation 1:

$$Pb_1 = \frac{EI(18.190)(2.685)}{(316.000)(20.875)} = 0.0074EI \tag{3}$$

$$Pb_2 = \frac{EI(10.437)(10.437)}{(398.526)(20.875)} = 0.0131EI \tag{4}$$

$$Pb_3 = \frac{EI(3.175)(17.700)}{(481.337)(20.875)} = 0.00559EI \tag{5}$$

Note that the diameter located in the center of the interface shows equivalent stiffnesses for the male and female sections indicated by the value of 10.437. This interface position clearly gives the higher and optimal value over the other positions. These other positions exhibit a thick-thin condition between the mating sections. Examining these results, the inner seal at numeral 3 gives only (0.0074/0.0131) 56% of the bearing pressure of the center seal, and the outer seal at numeral 5 (0.00559/0.0131) 43%, less than half.

This inventor does not insist that this invention hold strictly to these equations in determining the location of the primary seal. Equation 2 is an approximation of the actual values which are more precisely predicted through such tools as finite element analysis. They are introduced only to show the relative advantage of locating the primary seal in the vicinity of the diameter designated by the numeral 4. As will be shown in the subsequent preferred embodiment of an actual design the special thread elements increase these theoretical bearing pressures significantly. The S-shaped load flank of the thread constrains the opposing members from separating without considerable forces above those predicted by the above equations. Without such a locking thread profile, migrating internal pressure along the thread interface to the center seal could produce enough pressure to yield the female member, resulting in a condition known as unzippering, or jump out of thread engagement.

To my knowledge neither my previous invention or others in use in the industry have decaying threaded sections on both proximal threaded sections, that is, those threaded sections nearest the full tubular product. In my previous invention, the primary seal was located in the thick/thin position and as a result the thread was constrained from only one side, the other side being free. But this invention overcomes these conditions by locating the seal in the center of the thread interface and constraining it from both directions by unique S-shaped loading flanks.

A reverse angle thread form is used as in my former invention but the thread element contour in this invention is modified to produce maximum radii in the thread root and crest areas. These larger radii reduce stress concentration between the mating surfaces; it is known that stress concentrations increase proportionately in a material as the radius in the material is made smaller. Also the rounding of mating surfaces alleviates the tendency of any particular thread to dig in to contacting cooperative surfaces. With the S-shaped loading flank threads, the threads roll together producing much less tendency to dig in or cause high friction on assembly. Since these threads are designed to be free running, clearances are provided to ensure that they do not introduce radial interference on the flanks of the thread. Thus they are designed to clear only the axial stabbing flank and to engage radially only the roots and crests of the pin and box thread elements.

The thread element is a unique form of a reverse load flank family. Not only does it decrease stress concentration in the acute angle of the thread root, but the make-up is smooth with the matching elements rolling along a curve into final contact. In the made up, fully assembled condition, the S-shaped loading flanks clamp the seal from both sides and offer high resistance to separation compared to other locking threads which feature the primary seal on the ends of connection members. For radial disengagement initial sliding movement along the S-shaped loading flanks is at the extreme negative angle of the blended radii. This movement converts some of the radial force into an axial direction and accentuates the trapping action more greatly than threads with straight load flanks.

Figure 2:
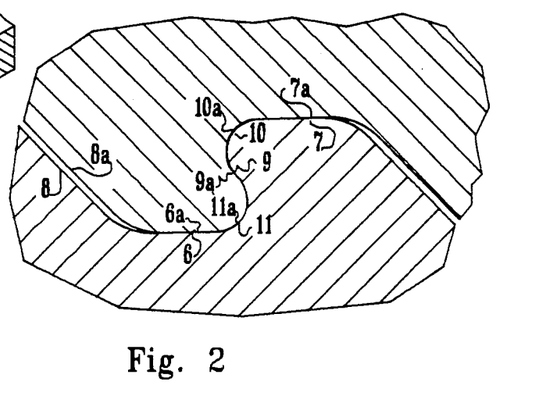
FIG. 2 is a cut away section view of the S thread element on a plane perpendicular passing through the longitudinal tubular axis in the manner of FIG. 1.

Refer to FIG. 2 for a derivation of the S-thread design. The thread element of the male thread element is shown engaged with the male connection thread element. The surfaces of the male thread element are designated 6, 7, 8, 9, 10, and 11 respectively. The female element is designated 6a, 7a, 8a, 9a, 10a, and 11a respectively. The surfaces designated at point 11-11a, 9-9a, and 10-10a constitute the S-shaped loading flank of the thread element. Radial surfaces at thread crests 6a and 7 and thread roots 6 and 7 are contacting. The surfaces opposite the loading flank surfaces are designated by the numerals 8 and 8a, which are male and female connections respectively. These surfaces are the only surfaces which do not contact each other, having a reasonable gap to ensure ease of assembly. These surfaces are referred to as the stabbing flanks of the respective thread elements. The box form is similar, being different in having a slightly thinner tooth to permit axial clearance between the two forms. The form is dependent of the taper angle of the threads, a, the angle of the load flank, b, and the height of the thread, h, measured perpendicular to the root and crest taper line. The taper angle a is the angle surfaces 6 and 7 make with the longitudinal centerline of the tubular. The angle of the S-contour is the angle b and is made with an axis perpendicular to the tubular centerline and surface 9 which is found midway between surfaces 6 and 7, being the blending of the two radii. The angle shown on the drawing can vary. The radius is designated as R in the ensuing equation:

$$R = \frac{h}{2(1 + \cos(b - a))} \quad (6)$$

The torque shoulder must only provide and adequate stop against any further helical advance of the threads into each other. Because of the relative high stiffness of the male and female sections in the center of the connection, resistance to buckling in the sections is optimized. Slipping is prevented because of the locking thread on both sides of shoulder. The profile of the torque stop may be square, a reverse angle, an S-shape, or some other form. In the preferred embodiment an S-shape torque shoulder is featured. This form offers additional locking in the proximity of the primary seal.

This invention may be applied to different tubular products used in the petroleum industry. With each application there is a definite improvement over the prior art of connection designs of that particular class of tubular.

Figure 3:
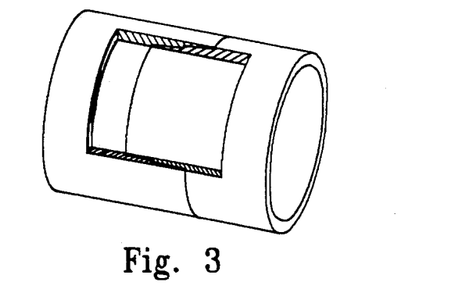
FIG. 3 is a perspective view of this invention applied to a plain tube connection

As is my previous invention, this optimized connection may be applied to the plain tube in FIG. 3. In this application, there is a gain in tensile performance of approximately 5% as a result of not requiring seals at the thread ends. There is, however, much greater resistance to torque as the torque shoulder is balanced by the thick sections in the middle of the connection. The greatest improvement is in the ability to withstand minimum collapse pressure followed by burst pressure. The seals remain elastic even under these high pressure loadings and do not yield.

Figure 4:
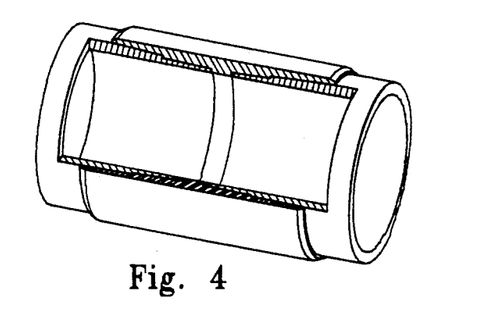
FIG. 4 is a perspective view of this invention applied to a coupled connection

Applied to the coupled connection as shown in FIG. 4, performance gains will be expected only in the ability to resist cyclic external and internal pressure loads. Also the extreme end of the inner member is not stressed highly and as a result should withstand stress corrosion better and resist more effectively pressure erosion from high flow rates.

Figure 5:
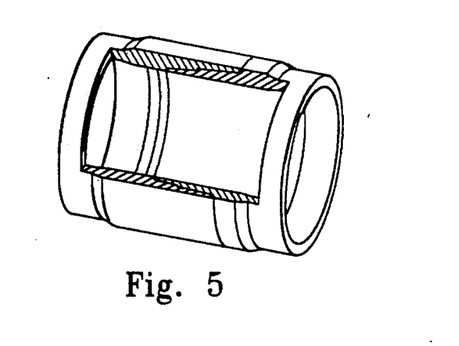
FIG. 5 is a perspective view of this invention applied to an upset connection

Applied to the upset connection of FIG. 5, a large center shoulder provides higher torque and axial compressive loads. A smaller upset O.D. and I.D. would be required to produce the same levels of performance of other members in its class.

Figure 6:
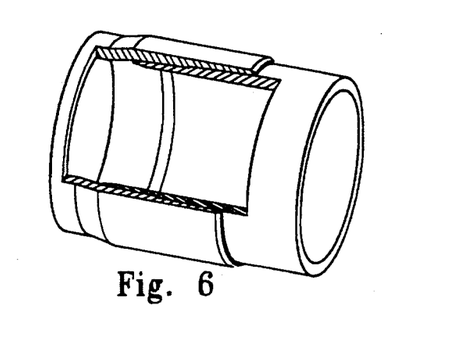
FIG. 6 is a perspective view of this invention applied to a swaged connection in which the box member is swaged outward before it is finished with this invention.

But the greatest improvement is found in applying this invention to the class of tubular using swaged members as shown in FIG. 6. In this application the female member is swaged outward and the male member may be optionally swaged inward. The improvement of this invention is approximately 20% in tensile efficiency over the other products which feature seals on one or both ends of their designs. Also the ability to withstand high cyclic loads of external and internal pressure without yielding the material in the seal area is obtained. Since the benefits of this invention both economically and functionally exceed those in the prior art by the greatest margin, the preferred embodiment of the invention is applied to this tubular class.

DESCRIPTION OF A PREFERRED EMBODIMENT

Figure 7:
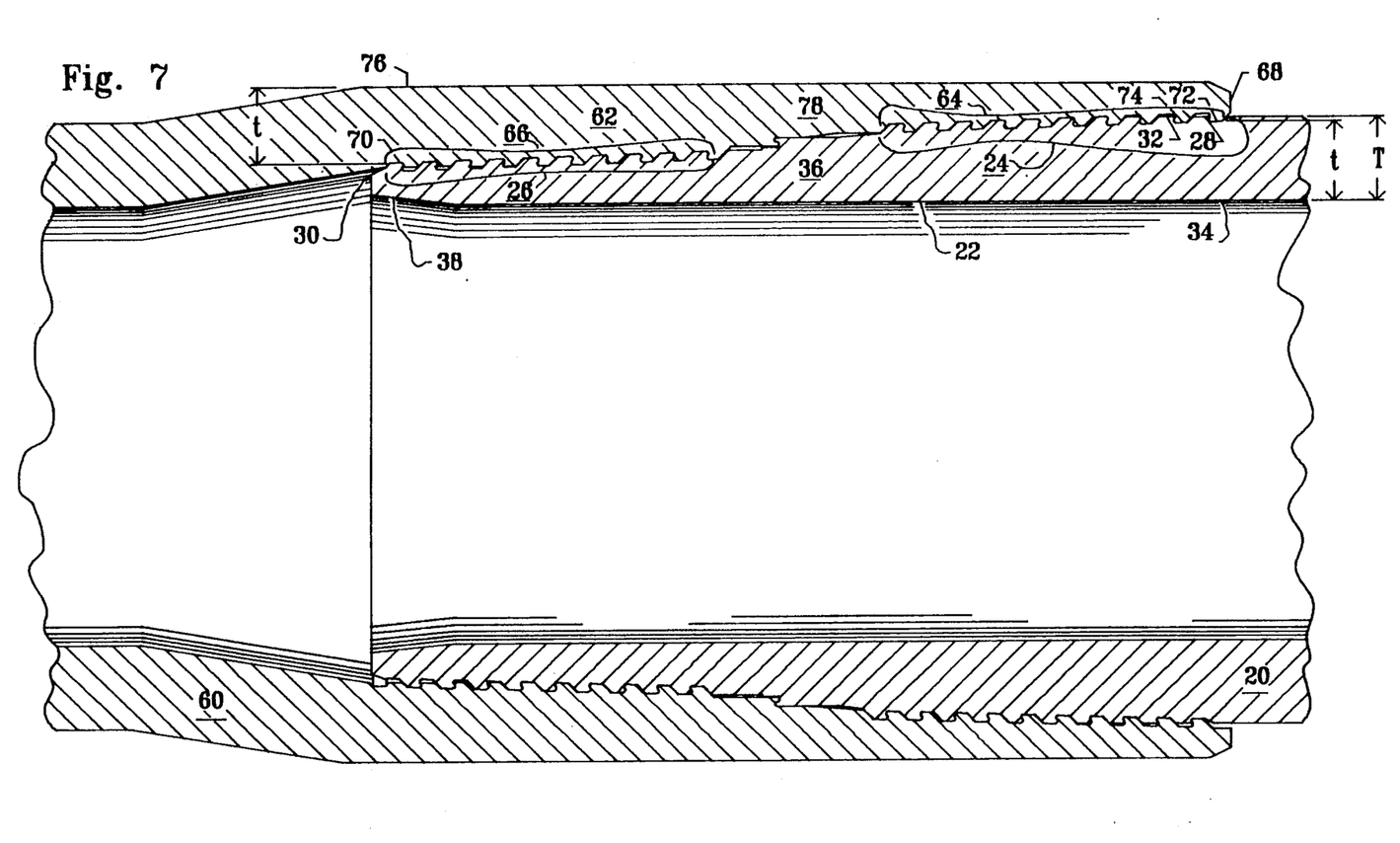
FIG. 7 is a cross sectional view of this invention fully assembled

FIG. 7 exhibits the preferred embodiment. Two lengths of tubular pipe comprising an expanded outer female member 60 and an inner male member 20 are joined by my connection. Each tubular pipe section in a string of pipe has both a male member or pin 22 and a female member 76 or female connection member which cooperate to form my connection. The proximal threaded section 66 of the female connection member 76 is that section closest to the full body of the tubular product 60. The proximal threaded section 24 of the male connection member 22 is found immediately adjacent to the full body of the tubular product 20. These proximal sections both contain a full thread portion along part of the length of the proximal threaded section and a decaying thread portion extending to the end of the connector member in the direction of the full tubular product. The decaying portion is indicated by thread elements which are less than their full height. In this embodiment the decay of the height is minimally one half the full thread height.

Opposite to the proximal threaded sections 66 and 24 are the distal threaded sections 26 and 64. These distal threaded sections do not have decaying threaded portions, being full height threads throughout the section. These distal threaded sections are located at the end of their respective connection members and are furthest from the full tubular product.

This decaying thread element permits high axial loading, nearly equal to axial loads which only the full tubular can withstand. This strength is obtained by increasing the thickness, t, to nearly equal to the full tubular thickness, T. The thickness must be the same for both proximal threaded sections since the strength of the assembly will depend on the minimum t only. Please note that in FIG. 7, both proximal threaded sections of connection members 76 and 22 show a decaying thread portion in which the last thread element is approximately half its original height. Both proximal threaded sections show this thread decay in the direction of the full tubular product. The male connection member 22 carries external thread steps 24 and 26 which extend from the last thread root 28 to the male connection member nose 30. The female connection member 62 also carries cooperating thread steps 64 and 66 from the female connection member face 68 to the root of the last engaged thread 70. The last thread roots 28 and 32 are engaged by the cooperating female connection member thread teeth 72 and 74 respectively at a section nearly equally to the full section of the tube. This critical area cross section spans from root 28 to inner diameter 34 of the male connection member, and from root 70 to outer diameter 76 on the female connection member. These cross sectional areas are nearly equal to the tubular cross sectional area. The full tension load applies across these areas. Between thread steps 24 and 26 on the male connection member is an area 36 comprising the torque stop and seal which cooperates with the female connection member area 78 located between threaded sections 64 and 66. These respective areas are shown in more detail in FIG. 8. At the extreme end of the male connection member an undercut 38 is to reduce the restriction of flowing substances and tools which may pass through the connection.

Figure 8:
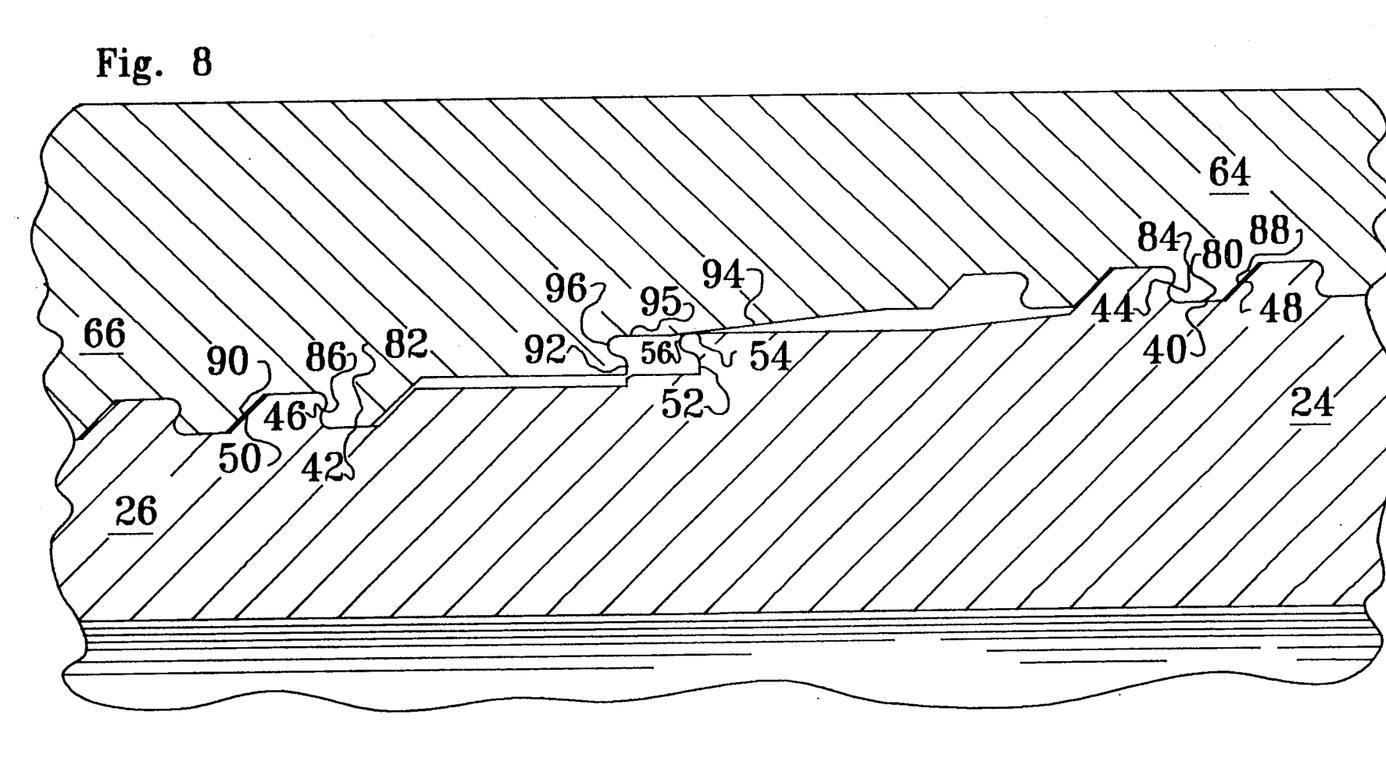
FIG. 8 is an enlarged cross sectional view of the center section of this connection at the hand tight position, or position which initially engages cooperatively radial interfering surfaces
Figure 9:
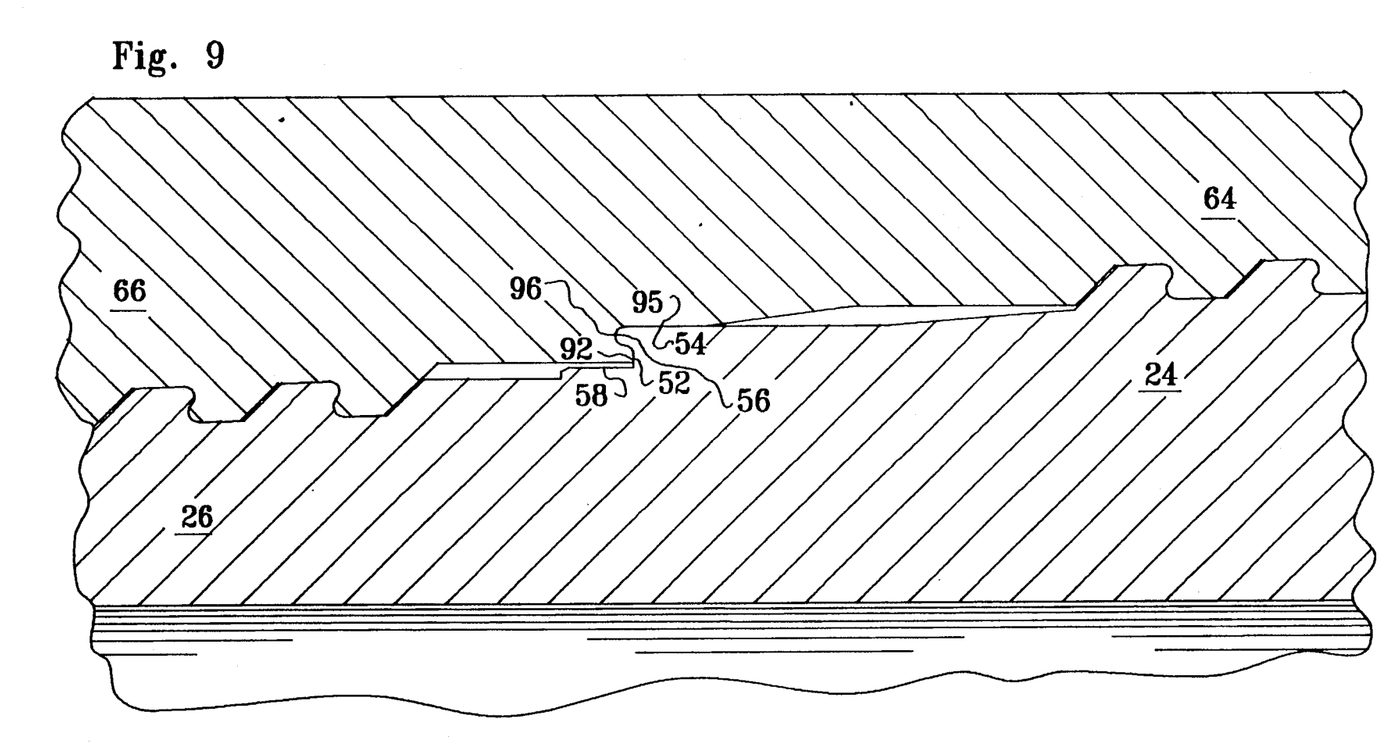
FIG. 9 is an enlarged cross sectional view of the center section of this connection assembled

FIG. 8 and FIG. 9 show the center portion of the connection. FIG. 8 shows the connection in the hand tight position, being that position when the interferences to the threads and seal are just beginning to act on their opposing members. At this point the male connection member thread root 40 and the female connection member thread crest 80 contact radially on the cooperating thread steps 24 and 64. In like manner and at the same time male connection member thread root 42 and female connection member thread crest 82 contact radially on the cooperating thread steps 26 and 66. Because of the threaded engagement of the threads the male connection member thread load flank 44 is urged into contact with the female connection member load flank 84 on threaded sections 24/64 as are load flanks 46 and 86 on threaded sections 26/66. This crest/root and flank/flank contact also occurs simultaneously by all other threads on each of the corresponding thread steps. Note also that male connection member stabbing flank 48 and the female connection member stabbing flank 88 show a gap as do male connection member flank 50 and female connection member flank 90. These flanks are not in contact. The gaps between them absorb threading tolerances and relative mismatch between cooperating threads to ensure proper free-running assembly. The hand tight position occurs in this connection at a distance of one-half ($\frac{1}{2}$) the lead of the thread which is the reciprocal of the thread pitch. For this embodiment, the thread pitch is 5 threads/in., i.e., the lead is 1/5 or 0.200 in./thread. In FIG. 8 the longitudinal distance between cooperating male connection member shoulder 52 and female connection member shoulder 92 is 0.100 inch. Note also at this position that radial male connection member cylindrical seal surface 54 is just contacting ramp female connection member surface 94. Subsequent axial motion of the male connection member into the female connection member will increase the radial force between contacting thread root/crest surfaces and primary seal surfaces. The primary surfaces will move together at a greater radial change per unit length than the thread surfaces, thereby introducing a clamping action from the thread elements which restrain the movement between those seal surfaces. Conceptually, this is an effect equivalent to bolting two 2×4's together near the center of the boards with two bolts approximately and inch apart. Inserting a flat object between these two bolts requires great force, but once inserted the boards apply a greater pressure on the flat object than they applied on each other before. In this invention the two cylindrical members are joined in like manner with the S-shaped threads acting as bolts.

The final 0.025 inches of axial movement reaches the torque shoulder and applies full seal interference between female connection member cylindrical seal surface 95 and male connection member cylindrical surface 54. Requiring this seal contact to occur just before reaching the torque shoulders ensures full meshing of threads and increases the clamping action upon the cylindrical seal surfaces, 54 and 95. With as little as 0.004 inches of diametrical interference between cylindrical seal surfaces, 54 and 95, enough sealing is produced to seal against the minimum burst pressure of 12,600 lbs./in$^2$. Energization pressure, that is, the pressing of the inner male connection member into the restraining outer female connection member through the application of an internal pressure, increases the effectiveness of this seal even further. The S shaped torque shoulder helps lessen this tremendous initial force acting on the shoulder by permitting small deflections of the male connection member promontory 56. Of course, upon reaching the final make-up position, this promontory is straightened back out again as it wedges into female connection member socket 96.

The moderate decline in bearing pressure just before shouldering is a valuable feature to guard against backout, or the unscrewing of the connection. If the connection is to unscrew it must fight an increasing radial pressure with separation of the shoulders acting on cylindrical seal surfaces 54 and 95, while sealing against leakage is only increased.

FIG. 9 shows the final assembly. Subsequent torque builds the axial pressure between torque shoulder surfaces 56 and 96 both adjacent to the male and female connection member seal surfaces 54 and 95 respectively, and the female connection member promontory 92 and male connection member shoulder 52. As the female connection member promontory radially pinches down it is restrained from excessive deformation from ramp 58 which is beveled in its entrant portion to permit engagement with female connection members with deformed shoulders. As torque builds the area between the lower female connection member proximal threaded section 66 and the male connection member step 42 are put into compression as the female connection member proximal threaded section 64 and lower male connection member distal threaded section 26 are put into tension. A tremendous degree of entrapment of one member into the other is produced. Each thread step provides 0.0094" of overhang from the S-shaped load flanked thread elements, thus a total of 2×0.0094 or nearly 0.019" entrapment overlap is present over the segments between the respective threaded sections. An additional entrapment of 0.025 is found at the S-shaped torque shoulder. Should the threads themselves deform or shear off significantly, the torque shoulder itself would continue to hold the members together.

A finite element analysis performed on this model with values of the young's modulus, E, equal to 30 million lbs./in.$^2$ and the interference between cooperating diameters 54 and 95 set equal to 0.004 in. predicts that the average bearing pressure on assembly alone to be 13,267 lbs./in.$_2$, that is, 13,267/(0.0131)(30,000,000)(0.004), or 8.44 times greater than eq. (4). In addition to the bearing pressure resulting from assembly, there is an energizing pressure that develops as the inner member swells against the outer member. This phenomenon further increases the seal pressure. The finite element model predicts an additional 13,000 lbs./in.$_2$ generated from minimum burst pressure. Thus the total seal pressure in excess of 26,000 lbs./in.$_2$ is capable of sealing over twice the minimum burst pressure of 12,600 lbs./in.$_2$. Of course, the pipe body would fail long before such a pressure could be reached. This tremendous increase can only be attributed to the clamping and restraining action of the S-shaped loading flanked threads on both sides of the seal.

Figure 10:
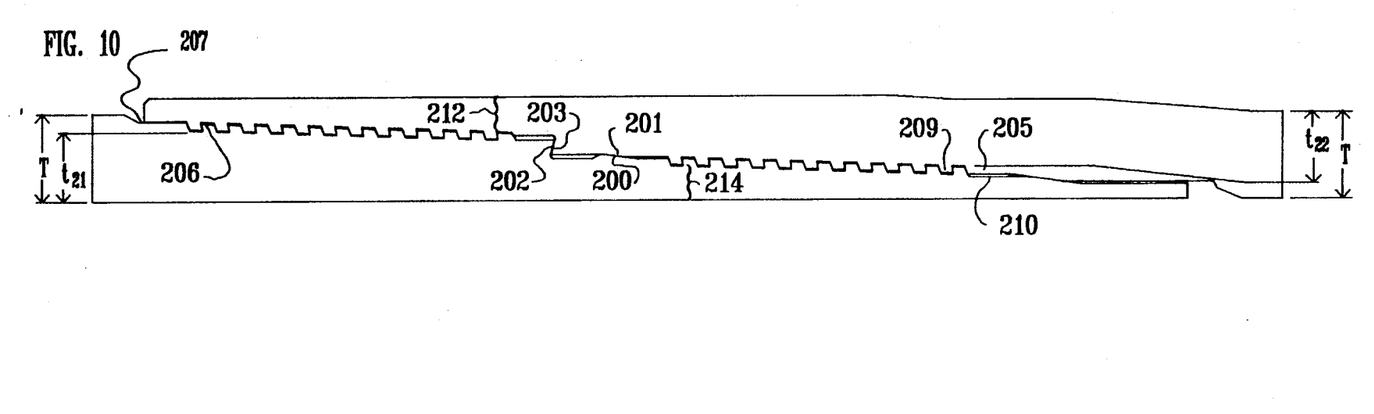
FIG. 10 is an enlarged cross sectional view of a prior art connection
Figure 11:
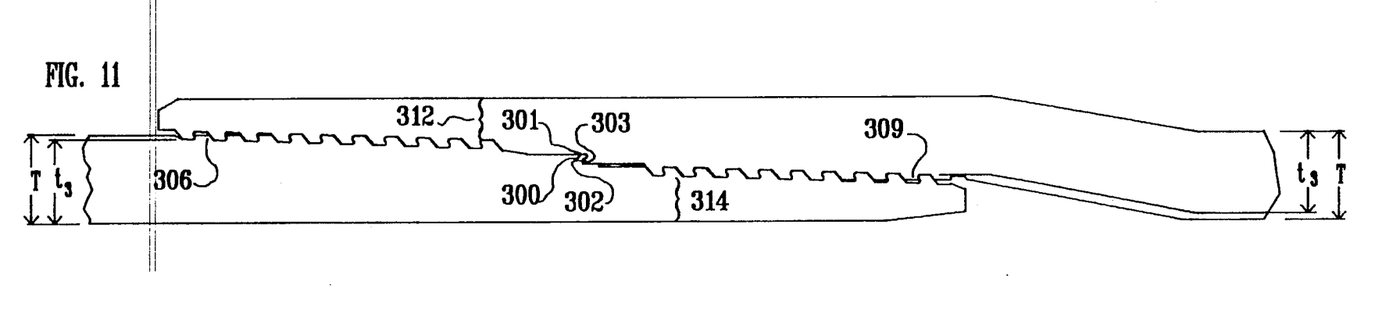
FIG. 11 is an enlarged cross sectional view of this present art connection

Refer to FIG. 10 and FIG. 11 which compare prior art. The prior art is shown in FIG. 10 with numerals 200–214. The new art is shown in FIG. 11 with numerals 300–314. The "T" on both ends of the figure represent the wall thickness of the full tubular product. The "t" found on each connection member represent the critical axial loading thickness, or critical thickness, of each tubular member. The $t_{21}$ and $t_{22}$ represent typical prior art values whereas the $t_3$ represents the new art value. The $t_{21}$ and $t_{22}$ of the prior art cannot be within a thread element height of the full tubular product thickness, T, since the thread elements do not decay. In the proximal section of the male connection member the last thread element 206 is full bodied. Also the last thread element 209 of the female connection member threaded section is full bodied. They cannot decay because of machined surfaces 205 and 210 which reduce the wall thickness of the tubular product. Surface 210 is in the proximal threaded section of the male connection member; another surface 205 is in the female connection member proximal threaded section. The center seal is designated by surface 200 on the male connection member and by surface 201 on the female connection member. These surfaces are conical and not cylindrical, in fact, their cones are not parallel. No attempt is made to locate this seal at a diametrical position which would force an equality of stiffness between the male and female connection members. In fact, the male connection member is made thinner than the female connection member. (Blose, U.S. Pat. No. 4,662,659, col. 5, lines 17–20 and lines 52–57) In addition, these conical seals are separate from the torque shoulder designated by numerals 202 and 203. The thread elements are straight flanked; there are no S-shaped load flanks. Clearances are root to crest, that is, between peak and valley. As such, the thread element employed differs considerably from the S-shaped load flanks of this invention.

Because of the separate conical seal and torque shoulder, the female connection thickness at 214 and to a lesser degree at 212 are considerably less than this optimized tubular connection which show thicker members at 314 and 312. If too thin, these sections may fracture on high torsion loading on torque shoulders 202 and 203.

The prior art cannot attain to the tension loading of this invention since its critical thickness is significantly thinner than the critical thickness of this invention. Also it cannot obtain the degree of pressure sealing since the conical seal is not integral with a torque shoulder and positioned to equalize cooperating member stiffness. If only high tension loading capability is desired, only a single threaded section is necessary, thereby not featuring the cylindrical seal and torque shoulder. In such an embodiment, each proximal end of the threaded section has a portion of decaying thread in the direction of the full tubular product.

While I have shown my invention in but one form, it will be obvious to those skilled in the art that it is not so limited, but is susceptible to various changes and modifications without departing from the spirit thereof.

I claim:

1. A connection for tubular members, the connection comprising:

(a) a female connector member;

(b) two threaded sections formed on an inside surface of the female connector member, the two threaded sections on the female connector member being separated by a female connector torque shoulder and a cylindrical seal surface on the inside surface of the female connector member;

(c) a male connector member; and (d) two threaded sections formed on an outside surface of the male connector member, the threaded sections on the male connector member being separated by a male connector torque shoulder and a cylindrical seal surface formed on the outside surface of the male connector member, said male connector member being adapted to threadably engage the female connector member so as to bring the male connector seal surface into sealing interference with the female connector member seal surface at least upon contact between the male connector torque shoulder and the female connector torque shoulder, and wherein the threads formed on the female connector member and the male connector member each have S-shaped loading flanks.

2. The connection of claim 1 wherein the stiffness of the female connector member at the cylindrical seal surface thereof is substantially equal to the stiffness of the male connector member at the cylindrical seal surface of the male connector.

3. The connection of claim 1 wherein the female torque shoulder and the male torque shoulder are S-shaped.

4. The connection of claim 1 wherein:

(a) the two threaded sections formed on each female connector member and each male connector member each comprise a proximal threaded section at an end of the respective connector member leading to a tubular product to which the respective connector member is connected and a distal threaded section at the opposite end of the respective connector member;

(b) the threads on the proximal threaded section of each connector member include a full thread portion along part of the length of the proximal threaded section and a decaying thread portion extending substantially to an end of the respective connector member to which the tubular product is connected; and (c) the threads on the decaying thread portion decay in the direction away from the full thread portion to less than the height of the threads in the full thread portion.

5. A connection for tubular members, the connection comprising:

(a) a female connector member;

(b) two threaded sections formed on an inside surface of the female connector member, the two threaded sections on the female connector member being separated by a female connector torque shoulder and a female seal surface on the inside surface of the female connector member;

(c) a male connector member; and (d) two threaded sections formed on an outside surface of the male connector member, the threaded sections on the male connector member being separated by a male connector torque shoulder and a male seal surface formed on the outside surface of the male connector member, and being adapted to threadably engage the female connector member so as to bring the male seal surface into sealing interference with the female seal surface at least upon contact between the male connector torque shoulder and the female connector torque shoulder, wherein the threads formed on the female connector member and the male connector member each have S-shaped loading flanks; and (e) wherein the stiffness of the female connector member at the female seal surface is substantially equal to the stiffness of the male connector member at the male seal surface.

6. The connection of claim 5 wherein the male seal surface and the female seal surface are both cylindrical.

7. The connection of claim 5 wherein the female connector torque shoulder and the male connector torque shoulder are S-shaped.

8. The connection of claim 5 wherein:

(a) the two threaded sections formed on each female connector member and each male connector member each comprise an proximal threaded section at an end of the respective connector member leading to a tubular product to which the respective connector member is connected and a distal threaded section at the opposite end of the respective connector member;

(b) the threads on the proximal threaded section of each connector member include a full thread portion along part of the length of the proximal threaded section and a decaying thread portion extending substantially to an end of the respective connector member to which the tubular product is connected, wherein the threads formed on the female connector member and the male connector member each have S-shaped loading flanks; and (c) the threads on the decaying thread portion decay in the direction away from the full thread portion to less than half of the height of the threads in the full thread portion.

9. A connection for tubular members, the connection comprising:

(a) a female connector member;

(b) a threaded section formed on an inside surface of the female connector member;

(c) a male connector member;

(d) a threaded section formed on an outside surface of the male connector member, the threaded section on the male connector member being adapted to threadably engage the female connector member; and (e) a full thread portion along part of the length of the threaded section of each connector member and a decaying thread portion extending substantially to an end of the respective connector member to which a tubular product is connected; and (f) wherein the threads on the decaying thread portion decay in the direction away from the full thread portion to less than the height of the threads of the full thread portion.

10. The connection of claim 9 further comprising:

(a) a female seal surface formed on the inside surface of the female connector member separating the threads along the threaded section of the female connector into two separate threaded sections; and (b) a male seal surface formed on the outside surface of the male connector member separating the threads along the threaded section of the male connector into two separate threaded sections; and (c) wherein the male seal surface is adapted to come into sealing interference with the female seal surface when the male connector member is threaded into the female connector member to a sealing position.

11. The connection of claim 10 wherein:

(a) The female seal surface and the male seal surface are both cylindrical.

12. The connection of claim 10 further comprising:

(a) a female torque shoulder formed on the inside surface of the female connector member adjacent to the female seal surface; and (b) a male torque shoulder formed on the outside surface of the male connector member adjacent to the male seal surface.

13. The connector of claim 10 wherein the stiffness of the female connector member at the female seal surface is substantially equal to the stiffness of the male connector member at the male seal surface.

* * * * *